No. 833,658. PATENTED OCT. 16, 1906.
H. AUCHU.
MIXER FOR EXPLOSIVES.
APPLICATION FILED MAR. 16, 1906.
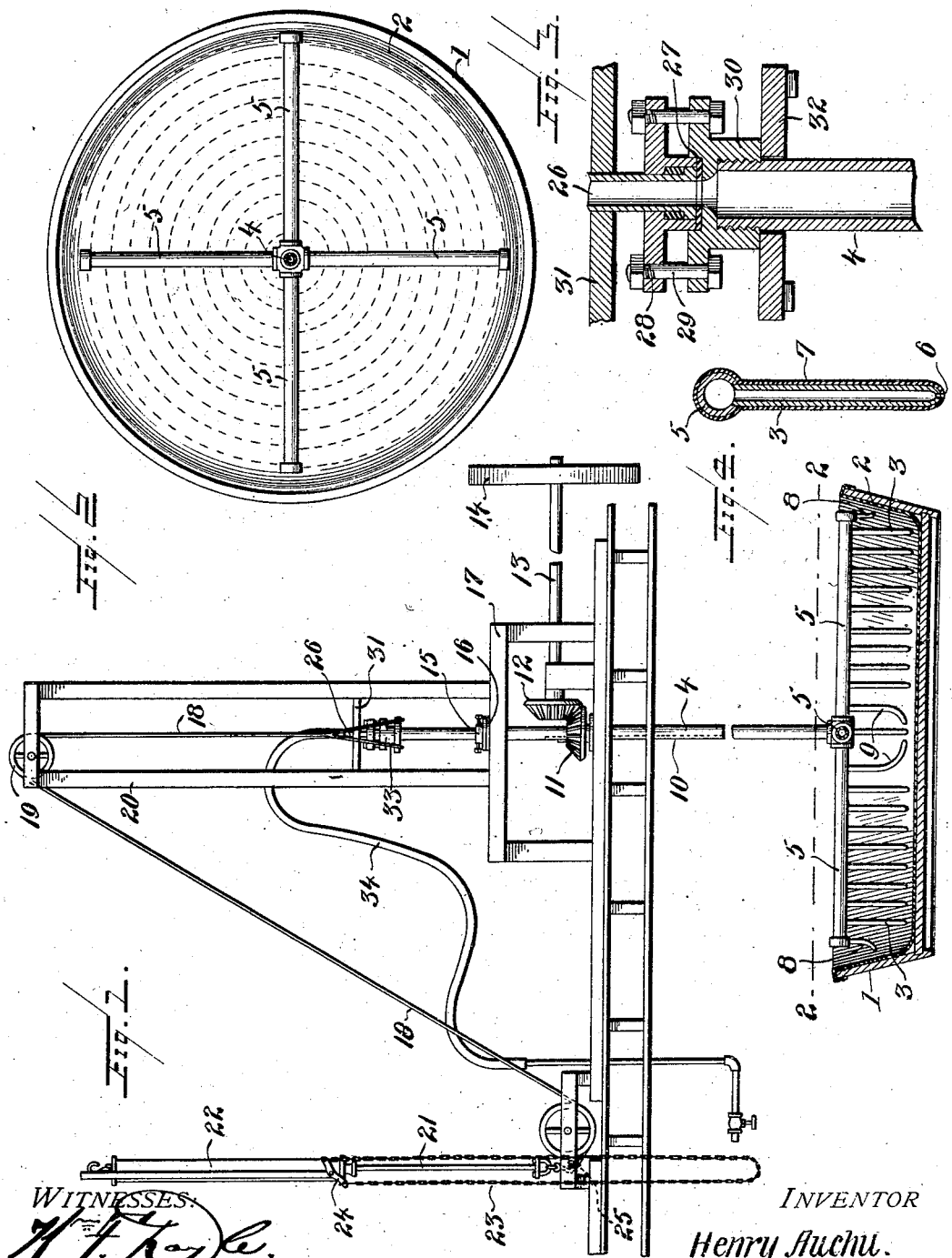
WITNESSES
INVENTOR
Henry Auchu
BY E. B. Stocking
Attorney

UNITED STATES PATENT OFFICE.

HENRY AUCHU, OF EMPORIUM, PENNSYLVANIA.

MIXER FOR EXPLOSIVES.

No. 833,658.   Specification of Letters Patent.   Patented Oct. 16, 1906.

Application filed March 16, 1906. Serial No. 306,461.

*To all whom it may concern:*

Be it known that I, HENRY AUCHU, a citizen of the United States, residing at Emporium, in the county of Cameron, State of Pennsylvania, have invented certain new and useful Improvements in Mixers for Explosives, of which the following is a specification, reference being had therein to the accompanying drawings.

This invention relates to a mixer for explosives, and particularly to a novel construction and arrangement of rakes or mixing-arms and means for driving the same.

The invention has for an object to provide a novel and improved construction of the mixing rakes or arms relative to the bowl or receptacle in which the explosive-mixing is done, together with means for introducing air or other fluid through said arms, so as to agitate and cool the ingredients during their mixture in the bowl.

A further object of the invention is to provide a novel and improved construction and arrangement of raising means for the rakes or arms, together with means for permitting and effecting a rotation thereof relative to the bowl into which they are introduced.

Other and further objects and advantages of the invention will be hereinafter fully set forth and the novel features defined by the appended claims.

In the drawings, Figure 1 is an elevation of the invention with the mixing-bowl in section. Fig. 2 is a horizontal section on the line 2 2, Fig. 1. Fig. 3 is a detail vertical section of the air connection with the shaft of the arms, and Fig. 4 is an enlarged vertical section through one of these arms or rakes.

Like numerals of reference indicate like parts throughout the several views of the drawings.

The numeral 1 designates a tub or other suitable receptacle comprising the mixing-bowl, which is provided with a lead lining 2 and into which the rakes or arms 3 are introduced from above, so as not to contact with the lining of the bowl at any point or to have any support therein. The support for these rakes or arms comprises the tubular shaft 4, provided at its lower end with tubular rake-heads 5, disposed at an angle to the shaft and to which the rake-teeth 3 are secured in any desired manner, and each tooth is provided at its lower end with a discharge-opening 6 to permit the escape of air or other fluid therefrom into the mixture in the bowl. To prevent friction in the movement of the teeth or by contact with any metallic substance by which sparking might occur, the teeth are herein shown as provided with a covering of rubber or other proper antifriction material, as indicated at 7 in Fig. 4, although the teeth-heads may be constructed of suitable material to prevent the necessity of this covering. The teeth are arranged in the heads 5 so that the openings therefrom in the tooth of each head are at a different point radially distant from the axis of rotation, so that the discharge of air into the bowl covers the entire surface thereof, as indicated by dotted lines in Fig. 2. As shown in that figure, the point of exit in one set of rakes is spaced out of alinement with those of the next succeeding or preceding set thereof. At the end of each of the heads a short rake 8 is provided and curved at its point of discharge, so as to direct the fluid against the side of the bowl, so as to deflect any rising portion of the mixture at the edges thereof due to the centrifugal motion. Each of the heads is provided at its end next to the driving-shaft with inwardly-curved teeth 9, directed toward a common center in order to prevent the collection at that point of a body of the mixture, which would not otherwise be thoroughly impregnated, as it lies directly beneath the axis of rotation, and these teeth therefore agitate this portion, so as to cause its thorough mixing with the remaining material in the bowl.

Any desired means may be provided for the purpose of rotating the rakes or arms, but preferably the form as shown in Fig. 1, where the driving-shaft 4 is provided with the splined portion 10, adapted to travel vertically through the bevel-gear 11, mounted thereon and meshing with the driving-gear 12, carried by the shaft 13, to which power is applied in any desired manner—for instance, by pulley 14. This permits the raising of the driving-shaft through the gear, and when in its position within the bowl the shaft is supported by means of an adjustable set-collar 15, resting upon the bearing-plate 16, carried upon the upper face of the frame 17. The shaft is raised and lowered by means of the cable 18, extending over a suitable pulley 19, disposed in the frame 20 and connected with the shaft 21 of a cylinder and piston lifting device, as shown at 22, which device is adapted to be controlled through the connections 23, extending to the valve 24, the lower end of the piston being provided with a connecting device 25 for the cable 19.

For the purpose of permitting the free rotation of the driving-shaft in relation to the air-pipe 26, which enters the same, any desired form of coupling may be used, one of which is shown in detail in Fig. 3, where the air-pipe is provided with a packed connection 27 and with a bolting-flange 28, mounted thereon, from which the bolts 29 extend to a coöperating flange 30, threaded upon or secured to the upper end of the driving-shaft 4 and provided with a suitable opening communicating with the air-pipe. The air-pipe is supported in a cross-frame 31 and held therein against rotation, while the driving-shaft rotates upon the connection therewith just described. For the purpose of securing a non-rotatable connection of the cable with the shaft a loosely-mounted plate 32 is disposed beneath the flange-coupling 30 to bear against the under face thereof, and to this the connectors 33 from the lifting-cable extend, as shown in Fig. 1. The air or fluid is supplied to the pipe 26 by means of a flexible connection 34 to allow vertical movement of the connection in the raising and lowering of the shaft and its rakes.

In the operation of the invention the ingredients to be mixed—for instance, any nitroglycerin or other dynamite compounds—are introduced into the bowl, and the rakes are lowered therein and rotated continuously. The teeth by their staggered arrangement upon the heads cover the entire area of the bottom of the bowl, as they are arranged to travel in different paths, and being spaced from the sides of the bowl all danger of friction therewith is prevented. The arrangement of the deflected teeth at the ends of the heads forces down the mixture to prevent it flowing up at the outer edges of the bowl, while the centrally-disposed teeth prevent the collection of a body of unmixed ingredients at the center thereof. The driving and lifting connection herein shown permits the rake-arms to be freely raised and lowered while still being driven, so that the teeth may be introduced to any desired depth in the mixture, although it is preferable that they reach near the bottom of the bowl in order that the air or fluid introduced may permeate upward through the mixture, and thus carry therefrom the heat generated by the chemical reactions between the ingredients. The invention, therefore, presents a novel and simple construction of parts for perfectly and throughly mixing the ingredients, while practically eliminating the great dangers surrounding previous methods of mixing the same by hand or machinery. It will be seen that the construction of the teeth is such as to permit a reversal in their direction of travel, which is desirable under some conditions of mixing, so as to secure the most efficient operation by an alternate driving in opposite directions.

Having now described my invention and set forth its merits, what I claim, and desire to secure by Letters Patent, is—

1. In an apparatus for mixing explosives, a mixing-bowl, a vertical tubular driving-shaft mounted centrally above the bowl, horizontal tubular rake-heads radiating from the lower portion of said shaft, depending vertical tubular apertured rake-teeth extending downward from said heads, and inserted on said heads at varying distances from the center of revolution of said teeth, so that the paths of travel of the teeth upon two adjacent heads do not coincide.

2. In an apparatus for mixing explosives, a mixing-bowl, a vertical tubular driving-shaft mounted centrally above the bowl, horizontal tubular rake-heads radiating from the lower portion of said shaft, depending tubular vertical apertured rake-teeth extending downward from said heads, and outwardly-deflected teeth at the ends of said heads.

3. In an apparatus for mixing explosives, a mixing-bowl, a vertical tubular driving-shaft mounted centrally above the bowl, horizontal tubular rake-heads radiating from the lower portion of said shaft, depending vertical tubular apertured rake-teeth extending downward from said heads, outwardly-deflected teeth at the ends of said heads, and inwardly-deflected teeth disposed at the ends of said heads next to the driving-shaft.

4. In an apparatus for mixing explosives, a mixing-bowl, a vertical tubular driving-shaft mounted centrally above the bowl, horizontal tubular rake-heads radiating from the lower portion of said shaft, depending vertical tubular apertured rake-teeth extending downward from said heads, outwardly-deflected teeth at the ends of said heads, inwardly-deflected teeth disposed at the ends of said heads next to the driving-shaft, means for supplying fluid to the driving-shaft and rakes, and means for rotating said shaft.

5. In an apparatus for mixing explosives, a mixing-bowl, a vertical tubular driving-shaft mounted centrally above the bowl, horizontal tubular rake-heads radiating from the lower portion of said shaft, depending vertical tubular apertured rake-teeth extending downward from said heads, outwardly-deflected teeth at the ends of said heads, inwardly-deflected teeth disposed at the ends of said heads next to the driving-shaft, means for supplying fluid to the driving-shaft and rakes, means for rotating said shaft, and means for effecting a longitudinal movement of the shaft while in driving relation.

6. In a mixing apparatus, a tubular shaft, tubular rake-heads at one end thereof, depending tubular apertured rake-teeth extending downward from said heads, and inserted on said heads at varying distances from the center of revolution of said teeth, so that the paths of travel of the teeth upon two adjacent heads do not coincide.

In testimony whereof I affix my signature in presence of two witnesses.

HENRY AUCHU.

Witnesses:
　H. A. Cox,
　Geo. P. Jones.